E. L. PERRY, Jr.
WASHER FOR GLASS GAGES, &c.
APPLICATION FILED MAR. 11, 1912.

1,038,642.   Patented Sept. 17, 1912.

WITNESSES
A. P. Hayes
C. J. Williamson

INVENTOR
Edward L. Perry, Jr.
by Chas. N. Fowler
Attorney

UNITED STATES PATENT OFFICE.

EDWARD L. PERRY, JR., OF PATERSON, NEW JERSEY.

WASHER FOR GLASS GAGES, &c.

1,038,642.                Specification of Letters Patent.       Patented Sept. 17, 1912.

Application filed March 11, 1912. Serial No. 683,179.

*To all whom it may concern:*

Be it known that I, EDWARD L. PERRY, Jr., a citizen of the United States, residing at Paterson, in the county of Passaic and State of New Jersey, have invented certain new and useful Improvements in Washers for Glass Gages, &c., and do hereby declare that the following is a full, clear, and exact description of the same, reference being had to the annexed drawings, making a part of this specification, and to the letters and figures of reference marked thereon.

My invention relates to packing rings of the character covered by United States Patent No. 631,661, August 21, 1899, to Edward L. Perry, Jr. in which the pressure within the members having joints to be packed, is utilized to expand the packing and thus make and maintain a tight joint. It has been discovered that by reason of the increased pressure and the high temperature of steam, the use of which has become common since the issuance of the before mentioned patent, that the washer having the construction illustrated therein does not satisfactorily meet the requirements of these new conditions of high pressure and high temperature, and the object of my invention is to so improve the construction of washers of this description as to enable them to act with high efficiency under the altered or special conditions named, and to this end my invention consists in the packing constructed substantially as hereinafter specified and claimed.

Figure 1:
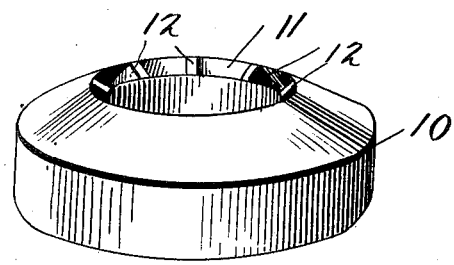
Figure 2:
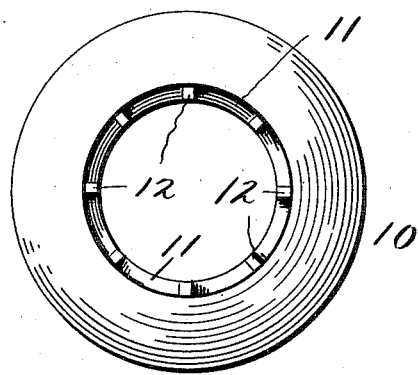
Figure 3:
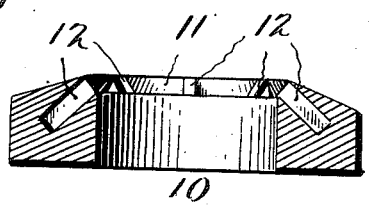

Referring to the accompanying drawings—Figure 1 is a perspective view of a washer embodying my invention; Fig. 2 a top plan view thereof; and Fig. 3 a cross section.

In its preferred form, my packing is in the form of a ring or washer 10, preferably of rubber, but the form and material may be varied without departure from my invention, and having parallel outer and inner sides with one end flat and the other inclined and having a circumferential channel or chamber extending inwardly and outwardly from the corner formed by the inner circumference and the outwardly inclined end, all as in the case of the packing or washer of Patent No. 631,661. In the use of this packing, as is clearly set forth in Patent No. 631,661, the steam or other fluid under pressure entering the annular expansion chamber 11, forces the two annular portions of the packing or washer at the sides of the said chamber outward and inward, respectively, and thereby a tight joint is produced and maintained. In the annular expansion chamber 11 at intervals, are narrow partitions 12 integral with the opposite walls of the chamber, which by connecting said opposite walls together impart such strength that even the extremely high pressures and high temperatures commonly used, will prevent the deformation and deterioration which are likely to occur when the construction illustrated in said Patent No. 631,661 is employed.

It is to be understood that I do not limit the use of my packing to any particular relation, nor do I restrict myself to particulars of form, construction and material unless the claims so require.

Having thus described my invention what I claim is—

1. A packing composed of expansible material, having a pressure-receiving chamber extending into the packing body from the exterior thereof at an angle to the joint-forming wall of the packing and providing lips at opposite sides, and connecting members between the walls of said chamber, spaced apart therein.

2. A packing composed of a ring of expansible material, said ring having an annular expansion chamber inclined from the edge of its inner wall, and a series of integral partitions spaced apart in said chamber and connecting the opposite walls thereof.

3. An elastic packing for gage-glasses, said packing consisting of a ring of elastic material having parallel outer and inner sides and one end flat and the other outwardly inclined, and having a circumferential expansion-chamber extending from the meeting edge of said inner side and inclined end, and at an inclination to both, and integral partitions bridging said chamber at intervals, and connecting the opposite walls thereof.

In testimony whereof I affix my signature in presence of two witnesses.

EDWARD L. PERRY, JR.

Witnesses:
CHARLES I. E. MASTIN,
GEORGE WINTERS.